United States Patent
Yoshida

(10) Patent No.: US 8,952,306 B2
(45) Date of Patent: Feb. 10, 2015

(54) AUTO FOCUS ADJUSTMENT APPARATUS AND IMAGE PICKUP APPARATUS

(75) Inventor: Tomokazu Yoshida, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 936 days.

(21) Appl. No.: 12/907,278

(22) Filed: Oct. 19, 2010

(65) Prior Publication Data

US 2011/0095166 A1  Apr. 28, 2011

(30) Foreign Application Priority Data

Oct. 23, 2009  (JP) ................................. 2009-244137

(51) Int. Cl.
*G02B 7/04*  (2006.01)
*G06M 7/00*  (2006.01)
*G02B 7/28*  (2006.01)

(52) U.S. Cl.
CPC ....................................... *G02B 7/28* (2013.01)
USPC ....................................... 250/201.4; 250/221

(58) Field of Classification Search
CPC . H04N 5/23212; H04N 5/23216; H04N 1/03; G02B 7/28; G02B 7/282; G02B 7/285; G02B 7/34; G02B 7/36; G02B 21/24; G02B 21/241; G02B 21/242
USPC ........................... 250/216, 221, 201.2–201.8; 348/231.99, 231.3, 231.6, 345–353; 396/104, 121–124, 72, 91–93, 125, 89, 396/77, 79–82, 111, 97, 106–109; 359/637
See application file for complete search history.

(56) References Cited

U.S. PATENT DOCUMENTS

| | | | |
|---|---|---|---|
| 5,508,506 A * | 4/1996 | Kusaka ...................... | 250/201.8 |
| 6,175,692 B1 | 1/2001 | Onoda et al. | |
| 6,268,885 B1 * | 7/2001 | Ohta ............................ | 348/345 |
| 6,363,220 B1 | 3/2002 | Ide | |
| 7,414,231 B2 | 8/2008 | Fukui | |
| 7,646,970 B2 * | 1/2010 | Sakaguchi ...................... | 396/91 |
| 7,872,684 B2 | 1/2011 | Nakano et al. | |
| 2005/0140815 A1 | 6/2005 | Nakano et al. | |
| 2006/0066957 A1 * | 3/2006 | Fukui ............................ | 359/689 |
| 2007/0258708 A1 * | 11/2007 | Ide ................................. | 396/89 |
| 2010/0110182 A1 * | 5/2010 | Kanayama .................... | 348/140 |

FOREIGN PATENT DOCUMENTS

| | | |
|---|---|---|
| JP | 04-122920 A | 4/1992 |
| JP | 2000-266988 A | 9/2000 |
| JP | 2001-091823 A | 4/2001 |
| JP | 2001-174690 A | 6/2001 |
| JP | 2005-181356 A | 7/2005 |
| JP | 2005-316187 A | 11/2005 |

(Continued)

*Primary Examiner* — Pascal M Bui Pho
(74) *Attorney, Agent, or Firm* — Fitzpatrick, Cella, Harper & Scinto

(57) ABSTRACT

An auto focus adjustment apparatus includes: a correction unit which corrects a defocus amount detected by a defocus amount detection unit, correspondingly to a focus area selected from a plurality of focus areas; a storage unit which stores a correction value to be used by the correction unit at a time of correcting the defocus amount; and a correction value changing unit configured to change the correction value, wherein the correction value changing unit is arranged to be capable of changing the correction value for a plurality of selected focus areas and at a plurality of zoom positions.

22 Claims, 4 Drawing Sheets

(56) References Cited

FOREIGN PATENT DOCUMENTS

| | | | |
|---|---|---|---|
| JP | 2006-98771 | A | 4/2006 |
| JP | 2006-293035 | A | 10/2006 |

* cited by examiner

AUTO FOCUS ADJUSTMENT APPARATUS AND IMAGE PICKUP APPARATUS

BACKGROUND OF THE INVENTION

1. Field of the Invention

The present invention relates to an auto focus adjustment apparatus including a defocus amount detection unit configured to detect defocus amounts, and relates to an image pickup apparatus equipped with the auto focus adjustment apparatus.

2. Description of the Related Art

In the auto focus adjustment apparatus of a general interchangeable photographing lens type single reflex camera system, a camera and an interchangeable photographing lens (hereinafter referred to as photographing lens) each incorporate a micro processing unit (MPU) individually to communicate mutually, and thereby the camera and the photographing lens function as a whole. To put it concretely, the camera MPU controls a sensor for detecting a defocus amount for focus detection, and the lens MPU transmits an optical focusing correction value of each photographing lens to the camera MPU to perform the optimum focus detection of each photographing lens.

It is conventionally publicly known to store adjustment values for auto focus adjustment in a camera and a photographing lens beforehand, which is the so-called focus adjustment. To put it concretely, the individual difference of each product due to tolerances or the like of using parts at the time of production is detected in a calibration process, and the adjustment values corresponding to individual operation characteristics are stored in a nonvolatile memory at the time of a factory shipment beforehand to make the camera and the photographing lens perform proper operations at the time of photographing on the basis of the adjustment data.

On the other hand, it is known that there is a possibility of a shift of the focusing position if a strong impact is applied to the camera and the photographing lens owing to their falls and the like after their factory shipments. Moreover, if a quick return mirror or the like is used an optical path formed by an optical system from photographing lens to a sensor for detecting a defocus amount, the angle of the mirror gradually varies every opening and closing of a shutter, and thereby a focusing position sometimes gradually deviates as a result.

At a time like this, it is better to bring the photographing lens or the camera into a service center of a manufacturing company, and to have the adjustment value in the nonvolatile memory of the photographing lens or the camera updated with a dedicated adjustment tool. Because the places where the service centers exist are limited, there is the problem of loss of swiftness.

To this problem, for example, Japanese Patent Application Laid-Open No. 2001-174690 discloses to make a camera hold a correction value different from the adjustment value set in a calibration process in a factory, and to be equipped with a unit for allowing a photographer to freely change the correction value. That is, Japanese Patent Application Laid-Open No. 2001-174690 discloses the technique enabling a photographer to freely correct the focus adjustment and to freely return the setting to that at the time of the factory shipment of the camera.

Japanese Patent Application Laid-Open No. 2001-174690, however, discloses only one different correction value, that is, a correction value having a constant value, indicating a single correction. On the other hand, more strictly speaking, the correction value that makes a focus optimum differs depending on a focus areas, an object light to be used for defocus amount detection, a distance ring position of the photographing lens, a zoom position in case of a zoom lens, a light source illuminating an object, a temperature, and the like, for each photographing lens. Moreover, this dependency differs with each photographing lens. In detail, the focusing deviations of some photographing lenses depend sensitively on their zoom positions, and the focusing deviations of some cameras depend sensitively on temperatures. The total focus shift including all correction factors that causes these focus shifts are designed to be within the so-called permissible circle of confusion of a camera system, which causes no practical problems as a product standard, and the total focus shift is adjusted in the calibration process in a factory.

On the other hand, in a recent digital camera, it is possible to enlarge only a part of a photographed image to any extent to display the part by a simple operation especially in the case of displaying the photographed image on a display of a personal computer. Because this sort of operation is not for appreciating the whole photographed image, the focusing accuracy equal to or higher than that in the permissible circle of confusion is required. As a result, there is a possibility that some viewers feel a part of an enlarged photographed image to be out of focus when looking at that part.

A camera system having a focusing deviation within the permissible circle of confusion by any way of appreciation should ideally be designed, and the focusing deviation should be adjusted in the calibration process thereof in a factory. However, if the focusing accuracy thereof is excessively raised for an industrial product that is manufactured in a large quantity, such as a camera, this remarkably increases the manufacturing cost of the product and results in a very expensive product.

SUMMARY OF THE INVENTION

It is an aspect of the invention to provide an auto focus adjustment apparatus and an image pickup apparatus, both capable of attaining a change of the correction value of a defocus amount more accurately, more understandably, and more simply in such a manner that a photographer can perform such a change as intended.

According to the present invention, an auto focus adjustment apparatus comprises a defocus amount detection unit configured to detect defocus amounts of a lens in a plurality of focus areas; a correction unit configured to correct defocus amounts detected by the defocus amount detection unit correspondingly to focus areas selected from the plurality of focus areas; a storage unit configured to store a correction value to be used by the correction unit at a time of correcting the defocus amount; and a correction value changing unit configured to change the correction value, wherein the correction value changing unit is arranged to be capable of changing the correction value for a plurality of selected focus areas and at a plurality of zoom positions.

Moreover, an image pickup apparatus of the present invention includes the aforementioned auto focus adjustment apparatus.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings.

The modes for implementing the present invention are shown in the following embodiments.

Embodiment

Figure 1:
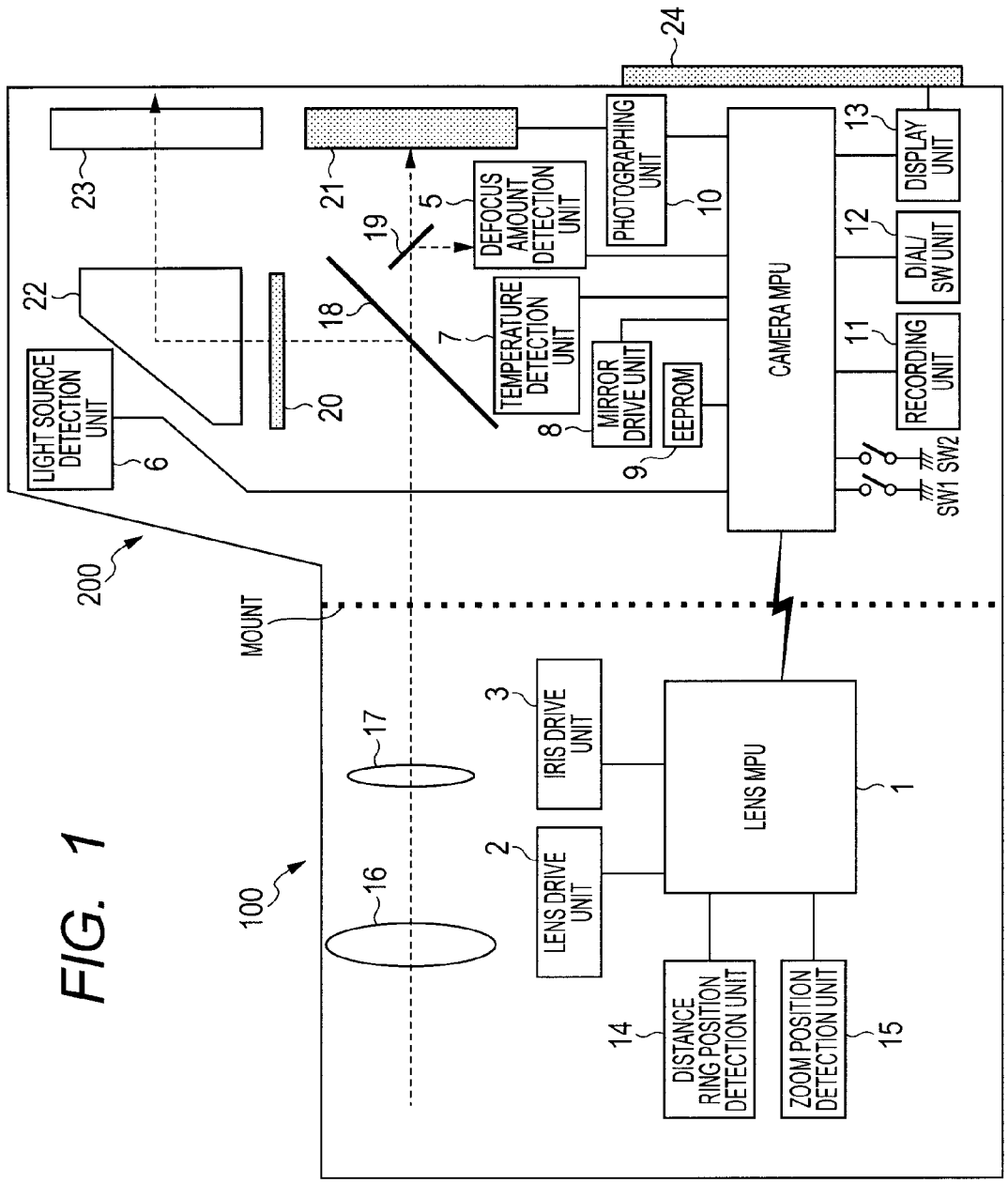
FIG. 1 is a block diagram showing the configuration of a camera system in accordance with an embodiment of the present invention.

FIG. 1 is a block diagram showing the configuration of an interchangeable photographing lens type single lens reflex camera including an auto focus adjustment apparatus in accordance with the present embodiment.

The camera shown in FIG. 1 includes a lens micro processing unit (MPU) 1, a lens drive unit 2 for driving a lens 16, an iris drive unit 3 for driving an iris 17, and a distance ring position detection unit 14 for detecting the distance ring position of a photographing lens 100. The information of the distance ring position is the information corresponding to the position of a focus lens of the photographing lens 100, and if the photographing lens is in an in-focus state of an object, this information corresponding to an object distance. The camera further includes a zoom position detection unit 15 for detecting a zoom position of the photographing lens 100, and the zoom position detection unit 15 can communicates the present distance ring position and zoom position to the camera body 200 side through the lens MPU 1.

The photographing lens 100 is composed of the lens MPU 1, the lens drive unit 2, the iris drive unit 3, the distance ring position detection unit 14, the zoom position detection unit 15, the lens 16, and the iris 17. Moreover, the photographing lens 100 is detachably connected to the camera body 200 through a mount as shown by a dotted line in FIG. 1.

The camera body 200 includes a camera MPU 4 capable of mutually communicating with the lens MPU 1 through the mount; a defocus amount detection unit 5 for photoelectrically converting an object image guided by a not-shown focus detection optical system to output the converted electric signal as voltage change; a light source detection unit 6 for photoelectrically converting an object image guided by a not-shown viewfinder optical system to output the converted electric signal as a voltage change; a temperature detection unit 7 for outputting a temperature as a potential; a mirror drive unit 8 for withdrawing a quick return mirror composed of a main mirror 18 and a sub mirror 19 at the time of starting photographing and returning them at the time of completing the photographing; an EEPROM 9, which is a nonvolatile memory; a photographing unit 10 for outputting an object image exposed to an imager (image pickup element) 21 as an image; and a recording unit 11 for recording a photographed image as an image file.

The camera body 200 further includes a dial/SW unit for changing or setting the various settings of the camera (correction value for correcting defocus amount in accordance with the present invention, shutter speed, iris value, photographing mode, and the like); a display unit 13; a switch SW1 for photographing preparation, which switch SW1 turns on at a first stroke operation (half depression) of the release button; a switch SW2 for photographing starting, which switch SW2 turns on at a second stroke operation (full depression) of the release button; a focusing plate 20; a penta prism 22; an eyepiece 23; and a display panel 24 connected to the display unit 13.

A defocus amount, which is a deviation quantity from a focal point of the lens 16, is calculated on the basis of an output from the defocus amount detection unit 5. To put it concretely, the defocus amount is calculated from an image shift amount of two images formed of the object lights passing through different two regions of the photographing lens 100, arranged with the optical axis thereof being put between them. The lights of these two images pass through the main mirror 18, which is a half mirror, and are reflected by the sub mirror 19, situated behind the main mirror 18, to be guided into the defocus amount detection unit 5 by a not-shown focus detection optical system.

The defocus amount detection unit 5 is a linear photoelectric conversion element and outputs voltage change of an object image formed on this element. The camera MPU 4 reads out the signals of these two images and performs a correlation operation on the read-out signals. The camera MPU 4 thereby calculates an image shift amount and multiplies the image shift amount by a specific coefficient corresponding to each focus area to convert the image shift amount into a defocus amount. In addition, the detection of the defocus amount is made to be performed at different focus areas (P1-P9) on a photographing screen as shown in #1 in FIG. 2. Then, a photographer can detect a defocus amount in a desired focus area by operating the dial/SW unit 12.

The defocus amount is obtained in this way, but the image shift amounts of all cameras do not always become zero due to the tolerances of the focus detection systems, even if an object is situated at a position where the defocus amounts are designed to be zero, that is, the image shift amounts become zero.

In the calibration process in a factory, accordingly, an image shift amount is adjusted to be zero beforehand by writing a parameter of the EEPROM 9 when the imager 21 is in an in-focus state. To put it concretely, first, the flange focus (the distance from the lens 16 to the imager 21) of a camera is measured, and the shift amount of the flange focus from a designed value is obtained. A reference lens, which has been focused on a reference chart situated at an already-known distance beforehand, is, next, corrected by the shift amount of the flange focus. Successively, the image shift amount of the reference chart is measured. Then, a numerical value (adjustment value) is written into the EEPROM 9 in order that the measured image shift amount may be zero.

Then, the camera MPU 4 sets the sum of an image shift amount calculated from the output of the defocus amount detection unit 5 and the adjustment value written in the EEPROM 9 as an image shift amount at the time of photographing, thereby getting rid of the individual differences of cameras. Because the adjustment value differs depending on each focus area on the photographing screen, the adjustment value is individually adjusted to each focus area (nine focus areas a-j in the embodiment) and is written into the EEPROM 9.

A best focus correction, a light source correction, and a temperature correction are added to the defocus amount converted from the image shift amount.

The best focus correction is a correction of the shift amount between the focal point of an object light at the time of photographing and the focal point of the object light of the focus detection optical system, described above. This shift amount is caused by spectrum sensitivity difference between the imager 21 and the defocus amount detection unit 5 and the spherical aberration of the photographing lens 100. That is, the shift amount is a value that differs depending on each photographing lens 100. Because the best focus correction value is stored in the lens MPU 1 of the installed photographing lens 100, the camera MPU 4 obtains the best focus correction value from the lens MPU 1 by communication with the lens MPU 1 to perform a correction.

Moreover, the light source correction is calculated on the basis of an output from the light source detection unit 6. To put it concretely, an object image reflected by the main mirror 18 passes through the focusing plate 20 and is guided into the light source detection unit 6 through a not-shown light source detection optical system. The light source detection unit 6 is configured of a couple of photoelectric conversion elements, each having spectrum sensitivity different from each other. Because the control itself of the light source correction has publicly been known by Japanese Patent Application Laid-Open 2006-098771 and the like, the detailed description of the control is omitted here. In short, the camera MPU 4 obtains the chromatic aberration information stored in the lens MPU 1 of the installed photographing lens 100 from the lens MPU 1. Then, the camera MPU 4 calculates a correction value on the basis of the output difference of the couple of the two photoelectric conversion elements. That is, the correction value is a value differing depending on each photographing lens 100 similarly to that of the best focus correction.

Moreover, the temperature correction is calculated on the basis of an output from the temperature detection unit 7. To put it concretely, because the flange focus amount changes dependently on a temperature, the change amount of the flange focus amount is measured beforehand as a setting value, and the change amount is corrected in accordance with the current temperature.

The auto focus adjustment getting rid of the individual differences of the camera body and the photographing lens is enabled by using a defocus amount including these correction values as the defocus amount. In addition, the values of the best focus correction, the temperature correction, and the light source correction are operated by the camera MPU 4 every focal point adjustment and are stored in the RAM thereof.

The operation of the camera (including the photographing lens 100 and the camera body 200) in accordance with the present embodiment will next be described.

In the present embodiment, when the switch SW1 is turned on, an auto focus adjustment function operates. That is, the camera detects the aforementioned defocus amount, and the camera MPU 4 transmits a lens drive instruction to the lens MPU 1 on the basis of the defocus amount by communication. The lens MPU 1 controls the lens drive unit 2 to drive the distance ring of the photographing lens 100 to perform a focal point adjustment. Moreover, when also the switch SW2 is turned on, the camera MPU 4, the photographing unit 10, the lens MPU 1, and the iris drive unit 3 perform a series of operations for photographing. After that, the switch SW1 is turned off, and thereby the auto focus adjustment function is stopped.

The way of correcting an adjustment value of a camera in accordance with the present embodiment will successively be described with reference to FIG. 2. In addition, because, if the adjustment value itself is changed, the change cannot be canceled, then the way of the correction of the adjustment value means a correction performed further to the adjustment value+the best focus correction+the light source correction+the temperature correction.

The dial/SW unit 12 is equipped with six operation members of an "AF correction input SW1," an "AF correction input SW2," an "interpolation on/off SW," an "entering SW," "AF correction position inputting dial," "AF correction value inputting dial, and "correction value clearing SW."

Figure 2:
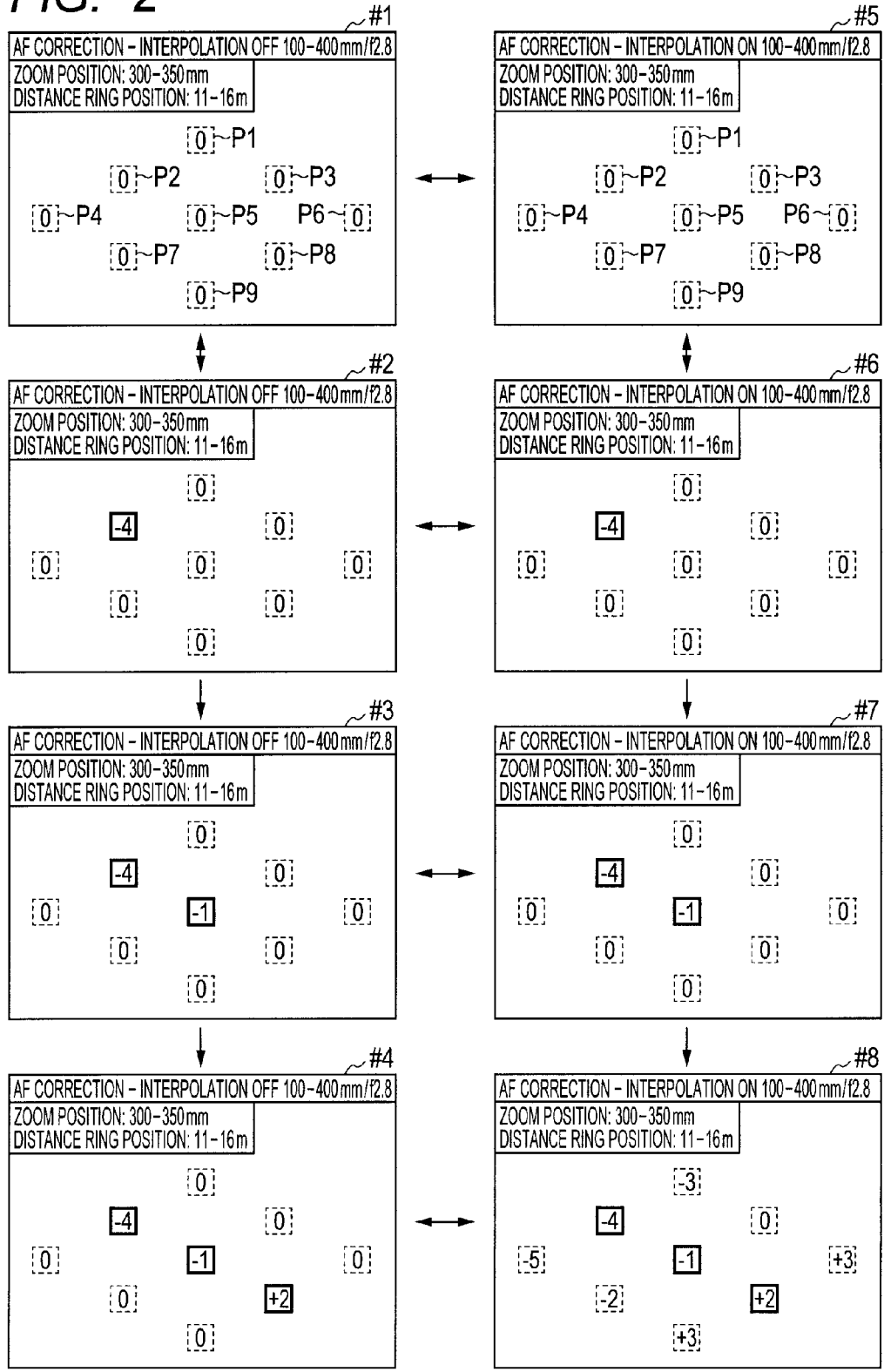
FIG. 2 is a display state transition diagram of a display panel at the time of changing a correction value to each focus area.

When the AF correction input SW1 is once turned on first, a screen #1 or #5 shown in FIG. 2 is displayed on the display panel 24, connected to the display unit 13. Whether the screens #1 or #5 is to be displayed is determined on the basis of the state preceding to the turning-on of the AF correction input SW1, and the screens #1 and #5 can mutually be exchanged every turning-on of the interpolation on/off SW. Moreover, when the AF correction input SW1 is turned on once more, the display on the display panel 24 escapes from these screens #1 or #5 to return to the normal state. On the display screen, the type of the presently installed photographing lens, and an AF correction position corresponding to the present zoom position, a distance ring position and a focus area are displayed besides the interpolation on/off state. The present correction value is displayed at the AF correction position as a numerical value.

The interpolation-off state will first be described.

When the screen #1 is displayed, a photographer selects a focus area that the photographer wants to correct, with the AF correction position inputting dial and inputs a proper correction value with the AF correction value inputting dial while really repeatedly photographing an object image. Moreover, when the photographer wants to clear the correction value, the photographer depresses the correction value clearing SW. As shown in FIG. 2, the focus areas to which correction values are set are displayed clearly with solid lines. That is, un-input focus areas are displayed with dotted lines. In addition, the last correction value is determined by an correction value of an adjustment value+the best focus correction+a temperature correction+a correction by the light source+a dial input correction, The correction value is a correction value at the zoom position of the present photographing lens transmitted from the lens MPU 1 here, that is, the distance ring position.

For example, if a photographer selects a focus area P2 on an upper left-hand side and inputs −4 therein, the screen #2 is displayed. Successively, if the photographer selects a focus area P5 at the center and inputs −1, the screen #3 is displayed. Furthermore, if the photographer selects a focus area P8 on a lower right-hand side and inputs +2, the screen #4 is displayed. As a matter of course, the un-input focus areas P1, P3, P4, P6, P7, and P9 are displayed with dotted lines, respectively, as shown in the screen #4, and their correction values are 0.

Successively, the interpolation-on state will first be described. In addition, the interpolation-on state means a state in which, if a photographer does not set all of many correction values but inputs some of the correction values, then a camera automatically supplies the other correction values.

Similarly to the case of interpolation-off state, if a photographer selects the focus area P2 on the upper left-hand side and inputs −4 therein, the screen #6 is displayed. Successively, if the photographer selects the focus area P5 at the center and inputs −1, the screen #7 is displayed. So far, the correction state is the same as that in the case of the interpolation-off state.

However, if the photographer furthermore selects the focus area P8 on the lower right-hand side and inputs +2, the screen #8 is displayed. The un-input focus areas P1, P3, P4, P6, P7, and P9 are displayed with dotted lines, respectively, at this time, but correction values are interpolated to be displayed as shown in the screen #8.

The method of the interpolation is performed as follows. A correction value at a focus area (x, y) is supposed to be:

$$f(x,y)=ax+by+c.$$

Then, it is supposed that the focus area P2 on the upper left-hand side is denoted by (−1, 0.5), the focus area P5 at the center is denoted by (0, 0), and the focus area P8 on the lower right-hand side is denoted by (1, −0.5), and the following equations are worked out.

$$f(-1,0.5)=-a+0.5b+c=-4$$

$$f(0,0)=c=-1$$

$$f(1,-0.5)=a-0.5b+c=+2$$

Hereby, a=2, b=−2, and c=−1 can be obtained. Therefore, for example, the correction values f at a focus area P1(0, 1) on an upper side and at a focus area P6(2, 0) on a right-hand side can be interpolated as follows:

$$f(0,1)=2\cdot0-2\cdot1-1=-3$$

$$f(2,0)=2\cdot2-2\cdot0-1=+3.$$

The corrections of the defocus amounts can be performed by using the focus areas as variables in this way. In addition, unknown coefficients that must be determined to determine the correction values f(x, y) are three coefficients of a, b, and c. Although the number of inputs of the correction values necessary to enable interpolation is three at the minimum, the coefficients a, b, and c are accordingly obtained by using the least squares method, which is a statistical operation, in the case where more than three inputs exist.

Figure 3:
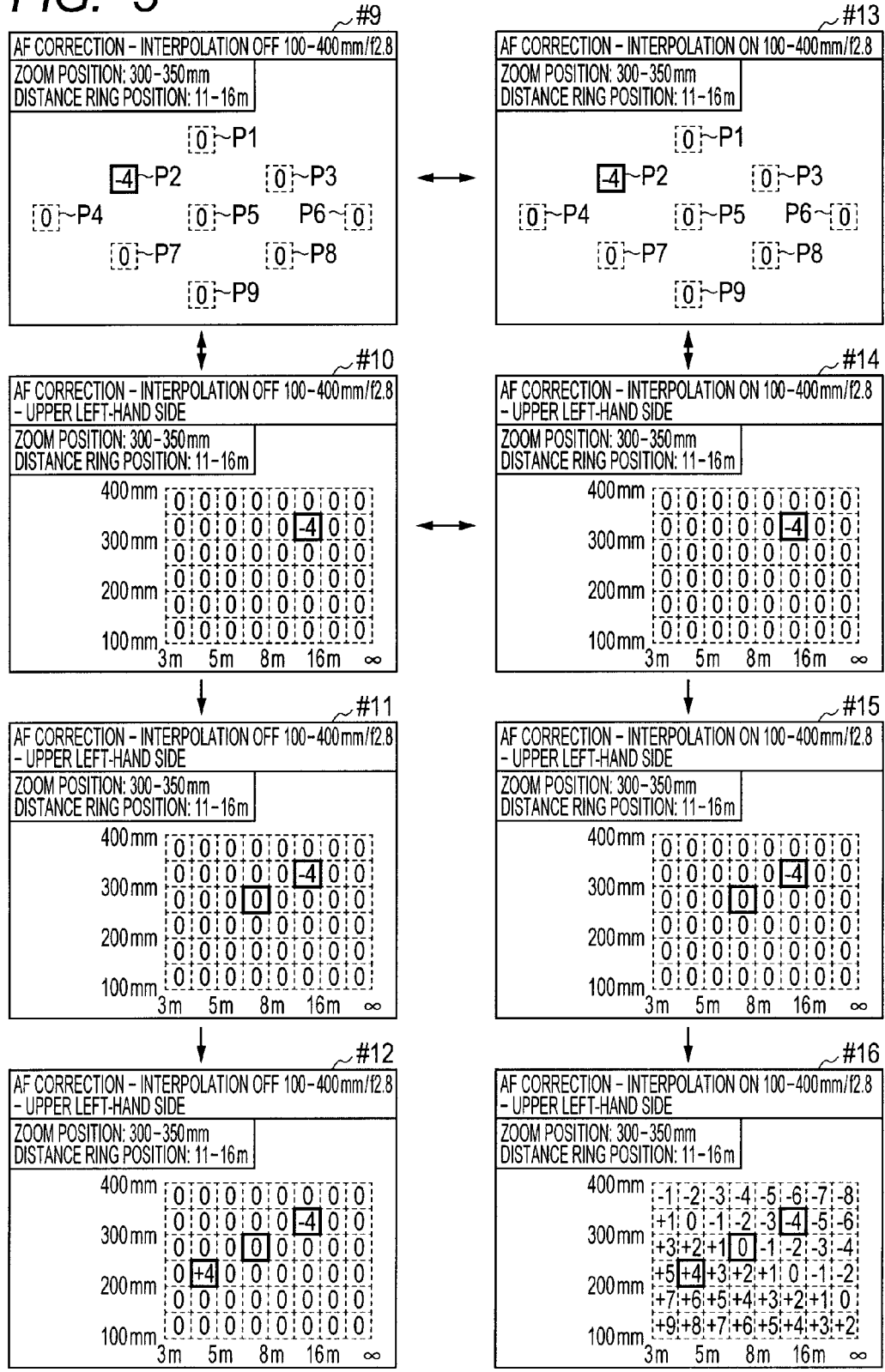
FIG. 3 is a display state transition diagram at the time of changing correction values of distance ring positions and zoom positions.

Moreover, when the entering SW is depressed in the state the focus area on the upper left-hand side, that is the focus area P2 displayed to be −4, is selected without interpolation as shown in the screen #9 in FIG. 3, a screen #10, which is at a lower hierarchy by one rank, is displayed. In addition, FIG. 3 shows that the places that must be set are three-dimensional when the correction of the defocus amount is performed to each of the focus areas, the zoom positions, the distance ring positions. Moreover, the transition of the display state from FIG. 2 to FIG. 3 is performed by a depression of the entering SW.

In the screen #10 of FIG. 3, "upper left-hand side," which indicates the selected focus area P2, and a matrix of correction values, in which distance ring positions are plotted on the X axis direction and zoom positions are plotted on the Y axis direction, are displayed, and the coordinates corresponding to the zoom position and the distance ring position of the current photographing lens are selected. A correction value can be changed with the AF correction value inputting dial. Moreover, a correction value at an arbitrary position different from the present zoom position and distance ring position can be changed (additionally stored) with the AF correction value inputting dial by operating it as shown in the screens #11 and #12.

On the other hand, when the entering SW is depressed in the state in which the focus area P2, which is displayed as −4, is selected with interpolation as shown in the screen #13, then the screen #14 at a lower hierarchy by one rank is displayed. Similarly to the case of interpolation-off, when correction values are changed as shown in the screens #15 and #16, correction values are interpolated to be displayed with dotted lines in un-input focus areas in the screen #16 unlike the screen 12 in the interpolation-off state.

The method of interpolation is performed as follows.

The correction value when a distance ring position is denoted by x and a zoom position is denoted by y is supposed to be:

$$g(x,y)=ax+by+c.$$

Then, a distance ring position of 3-4 m and a zoom position of 100-150 mm are set to (0, 0), and a distance ring position of 32-∞m and a zoom position of 350-400 mm are set to (7, 5). Then, the following equations are worked out.

$$g(5,4)=5a+4b+c=-4$$

$$g(3,3)=3a+3b+c=0$$

$$g(1,2)=a+2b+c=+4$$

Hereby, a=−1, b=−2, and c=9 are obtained.

Therefore, for example, the correction values at (0, 0) and (7, 5) can be interpolated as follows:

$$g(0,0)=-1\times0-2\times0+9=+9$$

$$g(7,5)=-1\times7-2\times5+9=-8.$$

The corrections of the defocus amounts can be performed by using the distance ring position and the zoom focus areas as variables in this way. In addition, similarly to the correction value f(x, y), although the number of inputs of the correction values necessary to enable interpolation is three at the minimum also for the correction value g(x, y), the coefficients a, b, and c are obtained by using the least squares method, which is a statistical operation, in the case where more than three inputs exist. The correction value in each focus area calculated from the correction values a, b, and c is stored (additionally stored) in the EEPROM 9.

Figure 4:
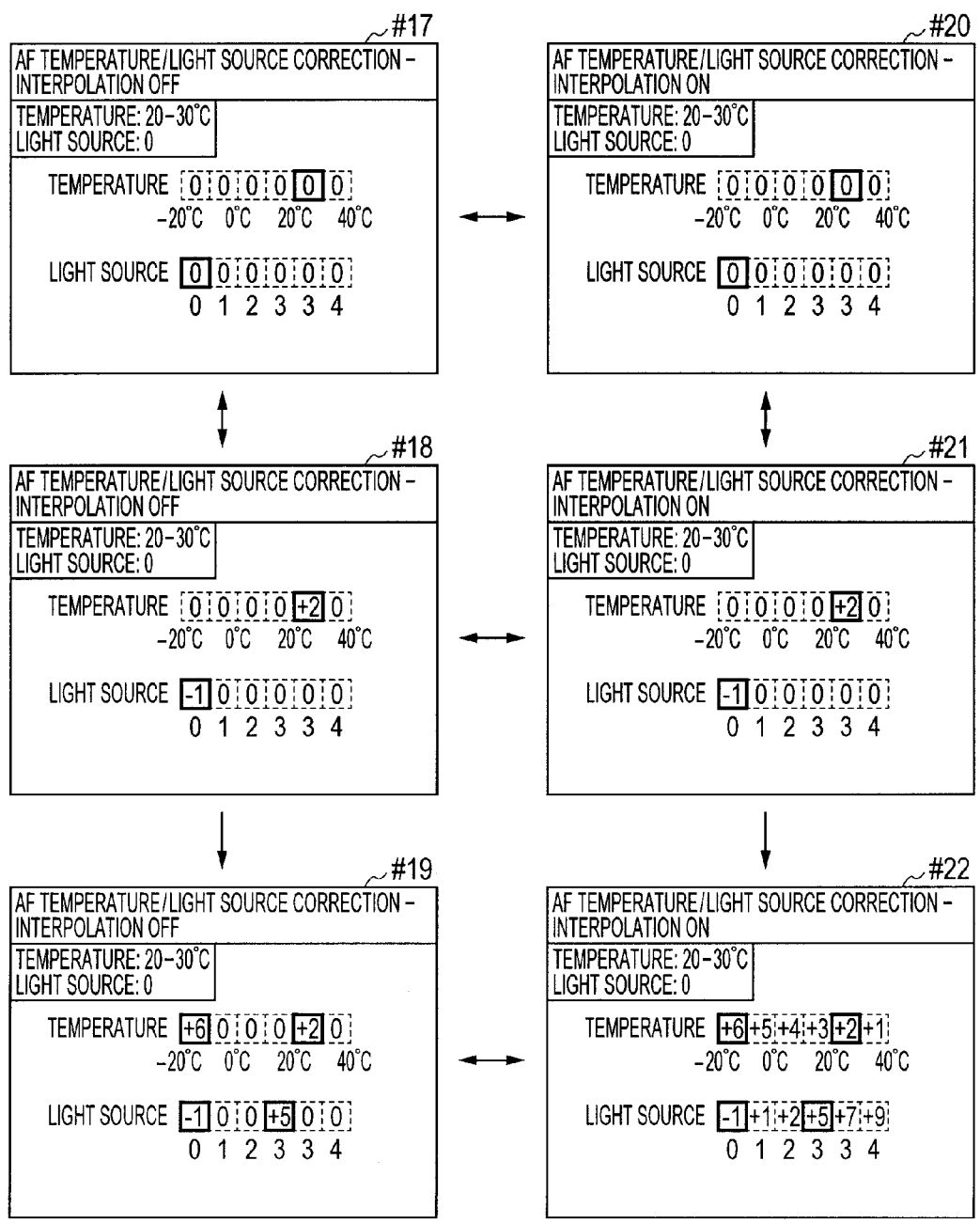
FIG. 4 is a display state transition diagram of the display panel at the time of a temperature correction and a light source correction.

When the AF correction input SW2 is once turned on by similar method, a screen #17 or #20 shown in FIG. 4 is displayed on the display panel 24, connected to the display unit 13. If the correction value for a temperature x is set as:

$$h(x)=ax+b,$$

then the correction of a defocus amount using a temperature as a variable can be performed. Moreover, if the correction value for an output difference x of the couple of the two photoelectric conversion elements having spectrum sensitivities different from each other, of the light source detection unit 6 is set as:

$$i(x)=ax+b,$$

then, the correction of a defocus amount can be performed by using the light source as a variable.

In addition, unknown coefficients that must be determined to determine the correction value h(x) and the correction value i(x) are two coefficients of a and b. Although the number of inputs of the correction values necessary to enable interpolation is two at the minimum, the coefficients a and b are accordingly obtained by using the least squares method, which is a statistical operation, in the case where more than two inputs exist. The correction values of the respective h(x) and i(x) calculated from the coefficients a and b are stored (additionally stored) in the EEPROM 9. Moreover, the screen #18 of FIG. 4 shows an interpolation impossible state, and the screen #19 of FIG. 4 shows an interpolation possible state.

In addition, although the correction formulae at the time of applying interpolations are expressed as linear expressions in the present embodiment for simplifying the description thereof, the correction formulae are not limited to those linear expressions. If there are numerical formula models suitable for the interpolations, then these models can similarly be applied. For example, there can be an embodiment capable of performing more accurate interpolation by interpolating the correction values of the temperature x in conformity with a quadratic expression, such as $$h(x)=ax^2+bx+c.$$

The camera (auto focus adjustment apparatus) in accordance with the aforementioned embodiment includes defocus amount detection unit (defocus amount detection unit 5 and camera MPU 4) for detecting defocus amounts of the lens 16 in a plurality of focus areas (P1-P9). Furthermore, the camera includes a correction unit (camera MPU 4) for correcting a defocus amount detected by the defocus amount detection unit correspondingly to the focus area selected from a plurality of focus areas. Furthermore, the camera includes a storage unit (EEPROM 9) for storing a correction value to be used when the correction unit corrects a defocus amount. Furthermore, the camera includes correction value changing unit (dial/SW unit 12 and camera MPU 4) for changing a correction value. The correction value can be changed in each of the selected focus area, and at each distance ring position and zoom position of a lens.

In the aforementioned configuration, the correction value is changed every selected focus area, and every distance ring position and zoom position of a lens, and thereby the more accurate correction of a defocus amount can be performed.

Furthermore, the defocus amount can be corrected in accordance with the light source information detected by a light source detection unit (light source detection unit 6) and the chromatic aberration information obtained by a chromatic aberration information obtaining unit (lens MPU 1).

In the aforementioned configuration, the defocus amount can be corrected more accurately in accordance with a light source illustrating external world (object).

Furthermore, the aforementioned configuration includes a temperature detection unit (temperature detection unit 7) for detecting a temperature and the defocus amount can be corrected in accordance with a detected temperature.

In the aforementioned configuration, the defocus amount can be corrected in accordance with a temperature more accurately.

Moreover, the aforementioned correction value changing unit is configured to perform an interpolation by using a plurality of correction values already stored, when no correction values corresponding to the present correction factor are stored in the storage unit, and to obtain the correction values corresponding to the present correction factor. Moreover, the correction value changing unit is configured to be able to add the correction value corresponding to an arbitrary correction factor into the correction value stored in the storage unit when the correction value corresponding to the correction factor is not stored in the storage unit. Moreover, the present configuration is made to perform an interpolation by obtaining the relation between a correction factor, which is a variable, and the correction value by a statistical operation.

In the aforementioned configuration, a correction of a defocus amount reflecting an intention of a photographer can be performed more correctly.

Moreover, the aforementioned configuration includes correction value displaying unit (display unit 13, display panel 24) for displaying a change state of the correction values.

In the aforementioned configuration, the correction value is displayed with dotted line and solid line shown in FIGS. 3 and 4, and consequently a photographer can attain more understandably and simply the change of the correction value in such a manner that the photographer can perform such a change as intended.

As described above, in accordance with the present embodiment, a camera or an auto focus adjustment apparatus capable of performing the changes of correction values of defocus amounts understandably and easily, reflecting an intention of a photographer more accurately, can be provided.

Other Embodiments

Although an interchangeable photographing lens type single lens reflex camera has been described in the aforesaid embodiment, the present invention can also be applied to an auto focus adjustment apparatus and optical equipment including other auto focus adjustment apparatus, such as a video camera.

Moreover, the control by the camera MPU 4 in the aforementioned configuration of the present invention may be configured to be performed by one piece of hardware, or the control of the whole apparatus may be achieved by a plurality of pieces hardware sharing the processing thereof. The present invention can be realized by executing the following processing. That is, the present invention can be realized by providing the software (computer programs) realizing the functions of the aforementioned embodiments to a system or an apparatus through a network (communication) or a computer-readable various recording media, and by processing the program codes by reading out the program codes and executing them with the computer (or CPU or MPU) of the system or the apparatus. In this case, the software and the recording media recording the software as the codes for a computer constitute the present invention.

In addition, the embodiments described above are only representative examples, and various variations and changes can be performed at the time of the implementation of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-244137, filed Oct. 23, 2009, which is hereby incorporated by reference herein in its entirety.

What is claimed is:
1. An auto focus adjustment apparatus comprising:
a defocus amount detection unit configured to detect defocus amounts of a lens in a plurality of focus areas;
a display control unit configured to control display of an image on a display unit;
a correction unit configured to selectively correct the defocus amounts detected by the defocus amount detection unit in the plurality of focus areas;
a storage unit configured to store correction values to be used by the correction unit at a time of correcting the defocus amount; and
a correction value changing unit configured to change the correction values,
wherein in a case that a correction value is changed by the correction value changing unit, the display control unit controls the display unit to display a first image to allow selection by a user of a focus area, among the plurality of focus areas, corresponding to the correction value to be changed,
wherein the display control unit controls the display unit to display a second image for the user to change the cor- rection value at a plurality of zoom positions and a plurality of distance ring positions in the selected focus area, and wherein the storage unit stores the changed correction value corresponding to the selected focus area, the distance ring position of the lens, and the zoom position.

2. The auto focus adjustment apparatus according to claim 1, wherein the correction unit is configured to correct the defocus amount in accordance with light source information detected by a light source detection unit and chromatic aberration information obtained by a chromatic aberration information obtaining unit.

3. The auto focus adjustment apparatus according to claim 1, further comprising a temperature detection unit configured to detect a temperature, wherein the correction unit is configured to correct the defocus amount in accordance with the temperature detected by the temperature detection unit.

4. The auto focus adjustment apparatus according to claim 1, wherein the correction value changing unit interpolates a correction value using a plurality of correction values already stored, when the correction value is not stored in the storage unit.

5. The auto focus adjustment apparatus according to claim 1, wherein the correction value changing unit is arranged to additionally write the correction values into the storage unit when the correction value is not stored in the storage unit.

6. The auto focus adjustment apparatus according to claim 1, wherein the display unit controls the display panel to display a state of the correction value changed by the correction value changing unit.

7. An image pickup apparatus including the auto focus adjustment apparatus according to claim 1.

8. The auto focus adjustment apparatus according to claim 1, wherein the display control unit controls the display unit to display the first image so that the correction value is displayed at a position corresponding to the position of the focus area.

9. The auto focus adjustment apparatus according to claim 1, wherein the display control unit controls the display unit such that the second image is displayed according to a switch being operated by a user in a state in which the first image is being displayed.

10. A control method of an auto focus adjustment apparatus, comprising the steps of:

detecting defocus amounts of a lens in a plurality of focus areas;

controlling display of an image on a display unit;

correcting the defocus amounts detected in the detecting step in the plurality of focus areas;

storing correction values to be used at a time of correcting the defocus amount in the correcting step; and changing the correction values, wherein in a case that a correction value is changed in the correction value changing step, the display controlling step controls the display unit to display a first image to allow selection by a user of a focus area, among the plurality of focus areas, corresponding to the correction value to be changed, wherein the display controlling step controls the display unit to display a second image for the user to change the correction value at a plurality of zoom positions and a plurality of distance ring positions in the selected focus area, and wherein the storing step stores the changed correction value corresponding to the selected focus area, the distance ring position of the lens, and the zoom position.

11. A non-transitory computer-readable storage medium storing a computer program comprising a program code for causing a computer to execute the control method in accordance with claim 10.

12. An auto focus adjustment apparatus comprising:

a defocus amount detection unit configured to detect defocus amounts of a lens in a plurality of focus areas;

a display control unit configured to control display of an image on a display unit;

a correction unit configured to selectively correct the defocus amounts detected by the defocus amount detection unit in the plurality of focus areas;

a storage unit configured to store correction values to be used by the correction unit at a time of correcting the defocus amount; and a correction value changing unit configured to change the correction values, wherein in a case that a correction value is changed by the correction value changing unit, the display control unit controls the display unit to display a first image to allow selection by a user of a focus area, among the plurality of focus areas, corresponding to the correction value to be changed, wherein the display control unit controls the display unit to display a second image for the user to change the correction value at a plurality of zoom positions, and wherein the storage unit stores the changed correction value corresponding to the selected focus area and the zoom position.

13. The auto focus adjustment apparatus according to claim 12, wherein the correction unit is configured to correct the defocus amount in accordance with light source information detected by a light source detection unit and chromatic aberration information obtained by a chromatic aberration information obtaining unit.

14. The auto focus adjustment apparatus according to claim 12, further comprising a temperature detection unit configured to detect a temperature, wherein the correction unit is configured to correct the defocus amount in accordance with the temperature detected by the temperature detection unit.

15. The auto focus adjustment apparatus according to claim 12, wherein the correction value changing unit interpolates a correction value using a plurality of correction values already stored, when the correction value is not stored in the storage unit.

16. The auto focus adjustment apparatus according to claim 12, wherein the correction value changing unit is arranged to additionally write the correction values into the storage unit when the correction value is not stored in the storage unit.

17. The auto focus adjustment apparatus according to claim 12, wherein the display unit controls the display panel to display a state of the correction value changed by the correction value changing unit.

18. The auto focus adjustment apparatus according to claim 12, wherein the display control unit controls the display unit to display the first image so that the correction value is displayed at a position corresponding to the position of the focus area.

19. The auto focus adjustment apparatus according to claim 12, wherein the display control unit controls the display unit such that the second image is displayed according to a switch being operated by a user in a state in which the first image is being displayed.

20. An image pickup apparatus including the auto focus adjustment apparatus according to claim 12.

21. A control method of an auto focus adjustment apparatus, comprising the steps of:
- detecting defocus amounts of a lens in a plurality of focus areas;
- controlling display of an image on a display unit;
- correcting the defocus amounts detected in the detecting step in the plurality of focus areas;
- storing correction values to be used at a time of correcting the defocus amount in the correcting step; and
- changing the correction values,
- wherein in a case that a correction value is changed in the correction value changing step, the display controlling step controls the display unit to display a first image to allow selection by a user of a focus area, among the plurality of focus areas, corresponding to the correction value to be changed,
- wherein the display controlling step controls the display unit to display a second image for the user to change the correction value at a plurality of zoom positions, and
- wherein the storing step stores the changed correction value corresponding to the selected focus area and the zoom position.

22. A non-transitory computer-readable storage medium storing a computer program comprising a program code for causing a computer to execute the control method in accordance with claim 21.

* * * * *